United States Patent [19]
Portolese

[11] Patent Number: 5,022,436
[45] Date of Patent: Jun. 11, 1991

[54] BALANCED DUAL POPPET VALVE

[75] Inventor: Larry A. Portolese, Granger, Ind.

[73] Assignee: Allied-Signal Inc., Morristown, N.J.

[21] Appl. No.: 472,527

[22] Filed: Jan. 30, 1990

[51] Int. Cl.⁵ .............................................. F16K 1/44
[52] U.S. Cl. ................................ 137/625.35; 251/282
[58] Field of Search ...................... 137/625.35, 625.36; 251/282

[56] References Cited

U.S. PATENT DOCUMENTS 1,896,947  2/1933  Glaenzer ........................ 137/625.37
2,709,451  5/1955  La Bour .......................... 137/625.35

FOREIGN PATENT DOCUMENTS 18276   6/1910  United Kingdom .......... 137/625.35
5584    6/1911  United Kingdom .......... 137/625.35
525491  8/1940  United Kingdom .......... 137/625.35

Primary Examiner—Arnold Rosenthal
Attorney, Agent, or Firm—Leo H. McCormick, Jr.; Larry J. Palguta

[57] ABSTRACT

In a fluid flow control device having a housing with an entrance port connecting a source of fluid under pressure to a bore and an outlet port connecting the bore to a fluid system, a balanced dual poppet valve for controlling the flow of fluid between the entrance port and outlet port along parallel flow paths.

4 Claims, 3 Drawing Sheets

BALANCED DUAL POPPET VALVE

This invention relates to a balanced dual poppet valve for a fluid control device. The dual poppet is carried by a cylindrical body and urged into engagement with seats on the housing by an actuation member to control the flow communication along parallel flow paths from an entrance port to an output port in a fluid system.

In the operation of an aircraft fuel system it is not unusual for an operational fluid that is supplied to the controls to vary in temperature and pressure. In an effort to protect sealing surfaces from wear caused by the flow of fluid, various seating surfaces protection schemes have been employed. In U.S. Pat. No. 3,934,612 ceramic and carbon pads are disclosed to provide long service for such a fuel valve while in U.S. Pat. No. 3,198,481 particular surfaces on the seals are positioned to reduce seal erosion. In order to assure that no leakage occurs across a closed valve it has been disclosed in U.S. Pat. No. 4,233,695 to sequentially close series poppet valves to reduce flow to zero and eliminate internal leakage. When the physical size of a valve is relatively small, the prior art valves operate in a satisfactory manner, however when a large volume of operating fluid is required the operation of the valve requires considerable actuation force to maintain stability.

Copending U.S. Pat. Application No. 472581, filed May 18, 1990 discloses a timing mechanism for a balanced dual poppet valve to reduce the possibility of internal leakage of fluid from a source to a fluid system. In this valve, a cylindrical body carries first and second poppet members. A sleeve member concentric to the cylindrical body has a bearing section that is located in a groove adjacent a second end of the cylindrical body. The sleeve member has a curved surface that extends from the flange and forms an extension for a parabolic curve that extends from the second end of the cylindrical body. A flexible member located in the groove on the cylindrical body acts on the bearing section to urge the sleeve toward a stop or the wall of the groove in the cylindrical body. When the actuation member moves the cylindrical body to initiate flow of fluid from the entrance port to the outlet port, the bearing section engages the stop such that the curved section on the sleeve forms a continuation of the segment of the parabolic surface on the second end of the cylindrical body. The sleeve surrounds the flexible member and protects the flexible member from erosion and damage as the fluid flows between the parabolic surface and second seat. When the actuation member moves the cylindrical body toward the rest position, where flow is terminated between the entrance port and outlet port of the housing of the valve, the curved section of the sleeve initially contacts the second seat to interrupt fluid flow controlled by the second poppet. As an actuation member moves the cylindrical body closer to the rest position, the resilient member is compressed between the sleeve and cylindrical body to form a seal to prevent internal leakage from the source into the bore. When the first poppet engages the first seat, the second poppet is already been seated and all flow from the source of fluid under pressure to the fluid system terminates.

In the present invention, the actuation of a balance dual poppet valve located in a housing and carried by a cylindrical body is controlled by the positioning thereof by an actuation member. The dual poppet valve allows fluid to flow in two independent and parallel flow paths from an entrance port to an outlet port. The cylindrical body has peripheral surface with a first end having a segment of a parabolic curve extending therefrom to define a first poppet and a second end having a segment of a parabolic curve extending therefrom to define a second poppet. The entrance port for the housing of the valve is connected to supply a cavity or bore with a source of fluid and an outlet port is connected to a fluid system. The cylindrical body is located in cavity or bore and moved linearly by an actuation member to control the communication of fluid between the entrance port and outlet port. The space relationship between the first poppet and a first seat and the second poppet and a second seat establishes the rate at which the fluid flows to the outlet port. Because of the curved surfaces of the first and second poppets, the flow rate of fluid between the entrance port and outlet port is exponential as a result of linear movement of the cylindrical body. The interior of the bore in the housing adjacent the second end of the cylindrical body has a parabolic shape such the flow path for the fluid from the second poppet is reversed and redirected through the center of the cylindrical body. The quantity of fluid which flows past the second seat is combined with the quantity of fluid which flows past the first seat to meet a fluid demand established by the positioning of the cylindrical body in the bore by the actuation member. The fluid pressure in the fluid presented to the bore acts on the first and second poppets in both the static and actuation states to establish substantially equal forces to create a balance valve and as a result only minimum actuation force is required to move the cylindrical body within the bore.

It is an object of this invention to provide a balanced dual poppet valve with structure to allow fluid flow between an entrance port and an outlet port through parallel flow paths.

It is a further object of this invention to provide a valve with first and second poppets carried by a cylindrical body and moved by an actuation member which have substantially equal fluid pressure acting on the first and second poppets in both the rest and actuation positions.

An advantage that this invention provides over the known valves resides in the first and second poppets which control and direct the flow of fluid from a source along parallel flow paths from an entrance port to an exit port to maintain a substantially balanced fluid pressure condition on the first and second poppets in both the rest and actuation positions.

These objects and advantages should be apparent from reading this specification while viewing the drawings wherein.

Figure 1:
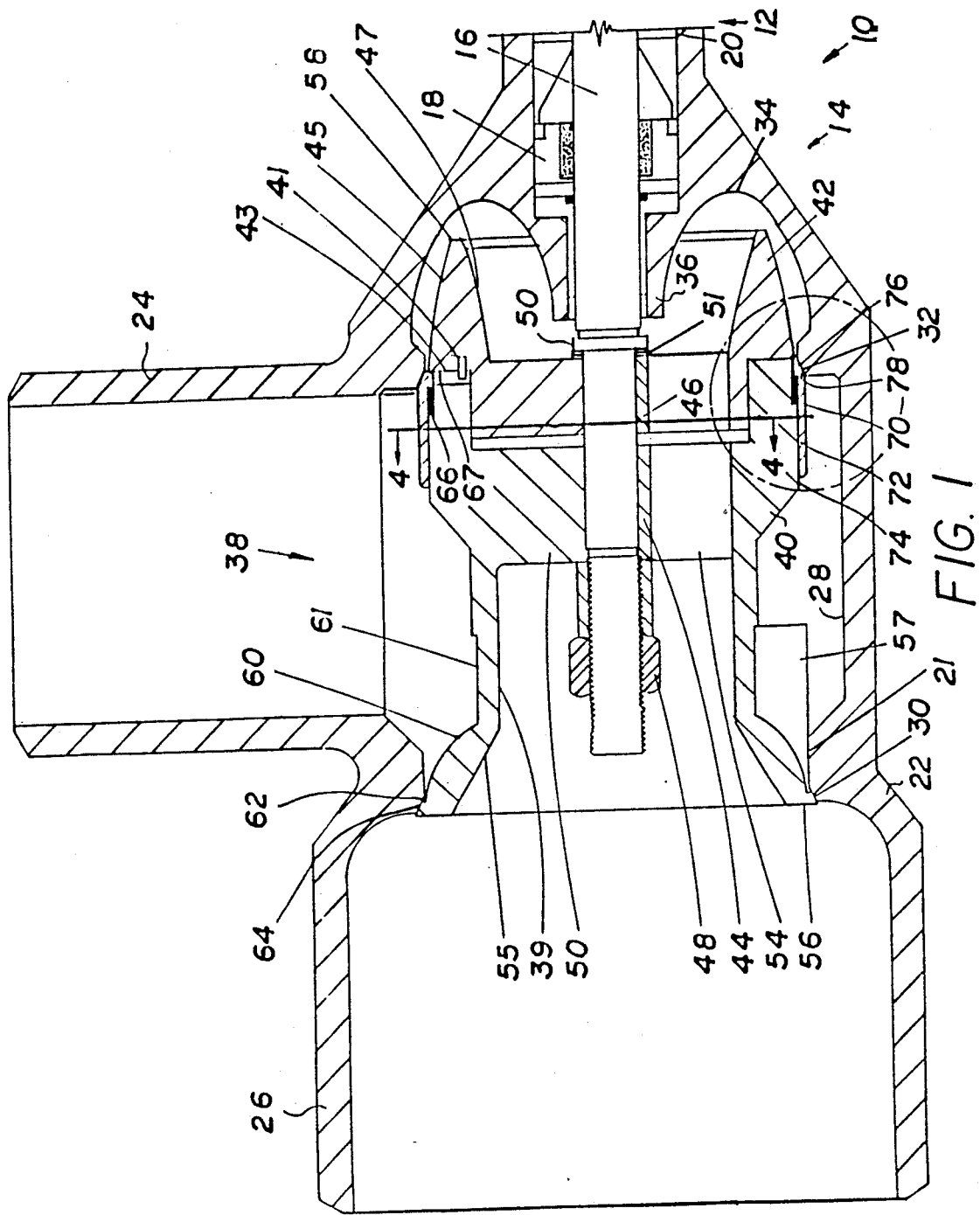
FIG. 1 is a schematic illustration of a sectional view of a valve made according to the principles of this invention.

A fuel flow control device 10 shown in FIG. 1 includes an actuation section 12 connected to a valve section 14. The actuation section 12 includes shaft seals 20, an actuation shaft or rod 16 and an actuator, not shown. The actuation shaft or rod 16 extends through bearing member 20 located in bore 18 in the housing 22 of the valve section 14. In response to an input from a actuator, fluid under pressure from a source flowed through an entrance port 24 to an outlet port 26 connected to a fluid system.

In more particular detail, the valve section has a housing 22 with a cavity or bore 28. The housing 22 has a first annular seat 30 and a second annular seat 32. The entrance port 24 is located between the first and second annular seats 30 and 32. The housing 22 has a curved surface 34 which extends from the second seat 32 to an annular section 36 that surrounds bore 18. The curved surface 34 is substantially a parabola and is selected to reverse the flow of fluid that flows past seat 32 toward the outlet port 26 without the creation of turbulence.

Figure 4:
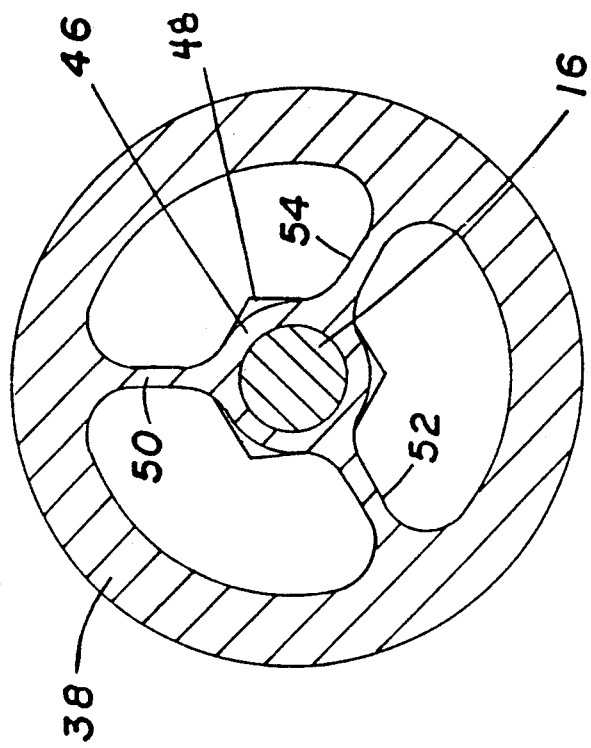
FIG. 4 is a sectional view taken along line 4-4 of FIG. 1.

A cylindrical body 38 made up of a first section 40 and a second section 42 is located in bore 28. actuation rod 16 which passes through center hub 44 in the first section 40 and has a center hub 46 in the second section 42 and nut 48 attached thereto. A guide pin 41 extending from face 67 aligns the internal flow paths of in the first and second sections 40 and 42. As nut 48 is tightened, hub 46 is brought into contact with shoulder 50 on actuation rod 16 such that a unitary structure is created. Under certain conditions, it may be necessary to add shims 51 between shoulder 50 and hub 46 to make sure that the first and second poppets are seated before the actuation member has moved the cylindrical body 38 to the rest position. Further, the first section 40 has a plurality of guide bearings ribs 57 (only one is shown) which engage surface 21 to maintain the cylindrical body 38 in the axial center of the cavity or bore 28. Center hubs 44 and 46 have a series of radial spokes 50, 52, and 54, see FIG. 4, that radially extend to the interior of the cylindrical body 38. The cylindrical body 38 has a first end 56 and a second end 58. Cylindrical body 38 has a smooth bore 39 with an annular flared section 55 adjacent the first end 56. The peripheral surface of the cylindrical body 38 includes a first curved surface 60 that extends from a relative constant diameter surface 61 to a shoulder 62. The peripheral surface 64 of the shoulder 62 forming a face that engages seat 30 to define a first poppet and seat seal. The first section 40 of the cylindrical body 38 also has a groove 66 on the peripheral surface that extends to the face 67 on the end thereof. Face 43 on the end of the second section 42 forms the end wall for groove 66. The second section 42 has a peripheral curved surface 45 that extends from end 58 to face 43 and an interior curved surface 47 that extends from end 58 to spokes 50, 52, and 54. Curved surfaces 45 is essentially in the shape of a parabola and curved surface 47 are concentric to the parabolic surface 34 in housing 22. Thus, the interior of housing 22 and the second end 58 of the cylindrical body 38 are shaped to reduce turbulence in flow of fluid that passes around the second poppet.

Figure 3:
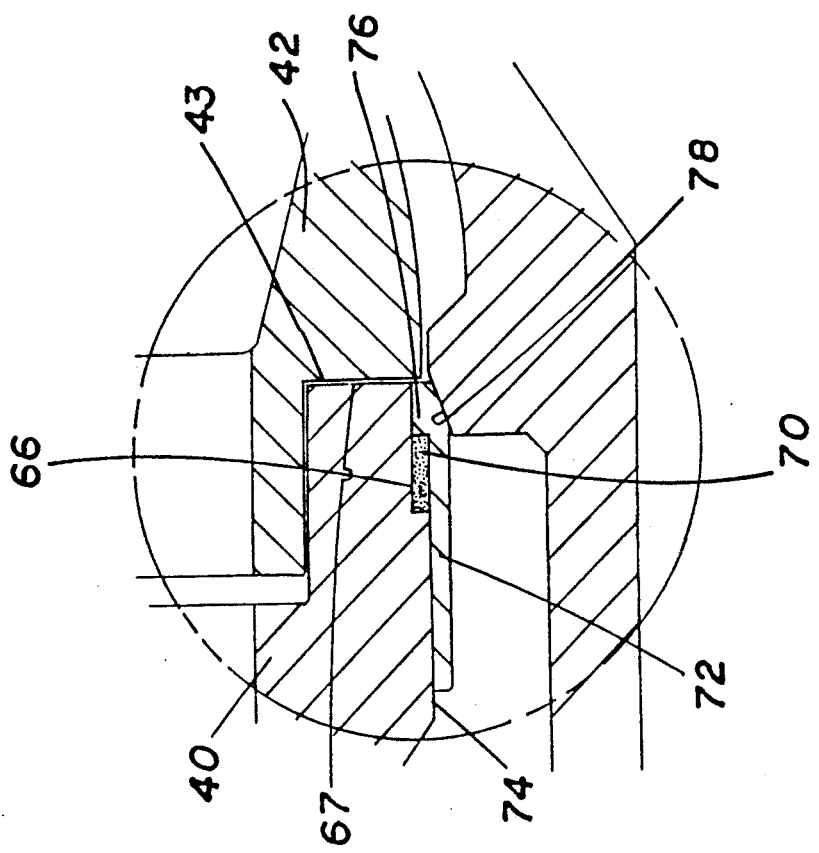
FIG. 3 is enlarged view of the circumscribed area 3 in FIG. 1.

Prior to the joining of the first section 40 with the second section 42, a flexible member 70, see FIG. 3 is located in groove 66. The flexible member 70 must be capable of withstanding varying temperature changes that occur in the supply fluid and still function in an intended manner of sealing and possessing resiliency. While many materials may possess these characteristics for this operation it has been found that laminated graphite functions the best.

A sleeve member 72, as best seen in FIG. 3, has a body section that is concentric to surface 74 on the peripheral surface of the first section 40 of cylindrical body 38. The sleeve member 72 surrounds and protects the flexible member 70 from direct contact with fluid supplied to the entrance port 24 to bore 28. A flange 76 on the sleeve member 72 which extends into groove 66 has a curved surface 78 that radially extends from the end face of the flange 76. The curved surface 78 forming a face that engages seat 32 to form a the second poppet and seat seal.

Figure 2:
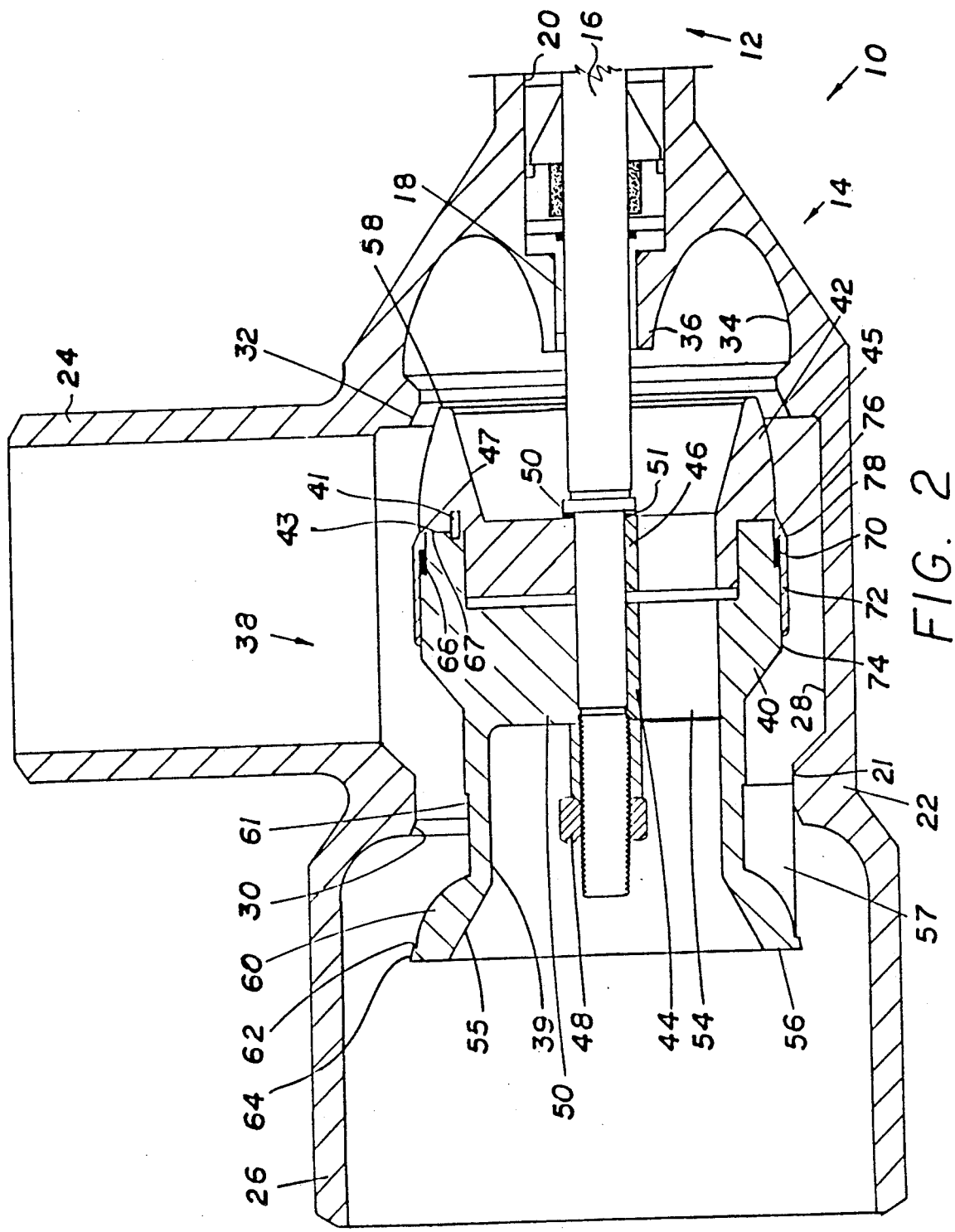
FIG. 2 is an illustration of the valve of FIG. 1 showing the position of first and second poppet member in an actuation position which allows fluid to flow from an entrance port to an outlet port.

In operation an input from the stepper motor moves the actuation push rod 16 which in turn moves the cylindrical body 38 to move face 64 on the first poppet away from seat 30 and allow fluid to flow directly from the entrance port 24 to the outlet port 26 in a manner as shown in FIG. 2. The space relationship between curved surface 60 and seat 30 defines a first volume or quantity of the fluid that directly flows past the first seat 30 to the outlet port 26. At the same time, a second volume or quantity of fluid flows past the second poppet to the interior of the cylindrical body 38. As the cylindrical body 38 is moved to an operation position as shown in FIG. 2, the resilient member 70 acts on the flange 76 to bring the same into engagement with a stop or face 43 on the second section 42. The curved surface 45 on the second section 42 forms a smooth transition for the flow of fluid from bore 28 to the interior of the cylindrical body 38. The space relationship between the curved surface 45 and face 32 defines the volume or quantity of fluid that flows past the second seat 32 to the interior of the cylindrical body 38. The curved surface 34 on housing 22 and curved surface 47 on the second section 42 of the cylindrical body 38 directs the second quantity of fluid to the interior bore 39 without the creation of substantial turbulence. As the second quantity fluid flows from bore 39, flare 55 allows the second quantity of fluid to be combined with the first quantity of fluid without the creation of turbulence. The first and second quantities of fluid are thereafter presented to the outlet port 26 for distribution to the fluid system to meet the demand as indicated by the position of the actuator. During the flow of fluid past the second seat 32, sleeve member 72 protects the flexible member 70 from erosion and deterioration that could occur should the fluid directly contact the flexible member 70. This flow of fluid from the entrance port 24 continues in accordance with the position of the cylindrical body 38 within bore 28. The volume of fluid is changed linear with movement of the cylindrical body 38 because of the relationship of the curved surface 60 with seat 30 and curved surface 45 with seat 32 to meet new or different fluid requirements whenever a new input signal is supplied to the actuator.

When the demand of fluid as inputted to the actuator terminates, the actuator moves the actuation push rod 16 and cylindrical body 38, which carries the first and second poppets, toward the closing or rest position, as shown in FIG. 1. Since the fluid pressure acts on substantially the same area of the first and second poppets, the force to move the cylindrical body 38 is relatively small. As the cylindrical body 38 approaches the rest position, the curved surface 78 on sleeve member 72 of the second poppet engages seat 32 to terminate the flow of fluid past seat 32 into the interior flow path through bore 39 while a small volume of direct flow to outlet port 26 continues to occur past seat 30. Further movement of cylindrical body 38 toward the rest position causes sleeve 72 to slide on surface 74 of the cylindrical body 38 and compress the flexible member 70 such that a seal occurs between the sleeve 72 and groove 66 to prevent fluid from leaking into the interior of the cylindrical body 38. Flexible member 70 continues to be compressed until surface 64 on the first poppet engages seat 30 engages seat 30 and flow from the entrance port 24 to the outlet port 26 completely terminates.

The dual poppet valve disclosed herein provides a control for a fluid system with stability and low actuation forces while accurately supplying components in the fluid system with varying quantities of fluid. This dual poppet valve provides a weight reduction over known state of the art valves wherein temperature variations and large volumes of fluid must be supplied with relative short time periods.

I claim:

1. In a fluid flow control device having a housing with a cavity therein connected to a source of fluid under pressure through an entrance port and an outlet port connected to a fluid system, a valve means located in said cavity and an actuator for moving the valve means within said cavity to control the flow of fluid between the entrance port and outlet port in accordance with an operator input, the improvement in the valve means comprising:

a cylindrical body having a peripheral surface with a first curved section adjacent a first end and a second curved section adjacent a second end, a center hub with a series of radial spokes connected to the cylindrical body and a plurality of guide bearings located adjacent said first end to maintain said cylindrical body in substantially axial alignment within said cavity, said actuator being connected to said center hub to move said first and second curved sections with respect to first and second seats on said housing to allow a first quantity of fluid to flow directly between said first curved surface and first seat and a second quantity of fluid to flow between said second curved surface and second seat and through the interior of the cylindrical body, said first and second quantity of fluids thereafter being combined for distribution to said outlet port, said fluid in siad cavity acting on substantially the same area of the peripheral surface of the cylindrical body and the first and second ends of the cylindrical body to create a balance force such that the input from the actuator controls the location of the first and second curved surfaces with respect to the first and second seats, said first and second curved surfaces being a segment of a parabola to obtain a variable flow rate of non-turbulent fluid from the entrance port to the outlet port with linear movement of the cylindrical body in said housing by the actuator.

2. In the fluid flow control device as recited in claim 8 wherein said housing is characterized by a parabolic shape to direct the flow of said second quantity of fluid in a reverse flow through the center of said cylindrical body.

3. In the fluid flow control device as recited in claim 1 wherein restriction on the flow of the second quantity of fluid through the cylindrical body is modified by the flow of the first quantity of fluid past the first end to compensate for any reaction force that may develop as a result of such flow relationship to maintain a balanced force relationship on said cylindrical body.

4. In the fluid flow control device as recited in claim 3 wherein said cylindrical body includes a flared section adjacent said first end to blend the second quantity of fluid with the first quantity of fluid to achieve said non-turbulent flow between the entrance port and the outlet port.

* * * * *